United States Patent
Wertitsch et al.

[11] Patent Number: 5,105,596
[45] Date of Patent: Apr. 21, 1992

[54] WINDOW FRAME SECTION AND PROCESS FOR ITS MANUFACTURE

[75] Inventors: Werner Wertitsch; Siegfried Röck, both of Vienna, Austria

[73] Assignee: Interprofil-GFK-Fenster & Bausysteme Gesellschaft m.b.H., Hohenberg, Austria

[21] Appl. No.: 243,028

[22] Filed: Sep. 29, 1988

[30] Foreign Application Priority Data

Jan. 30, 1986 [AT] Austria .................. 226/86

[51] Int. Cl.⁵ ............... 52 732; 52 309.13; 49 505; E04B 1/62
[52] U.S. Cl. .................................................. 52/397
[58] Field of Search ........... 52/309.13, 731, 732, 52/397, 764; 49/504, 505

[56] References Cited

U.S. PATENT DOCUMENTS

| | | | |
|---|---|---|---|
| 2,883,717 | 4/1959 | Arnd | 52/764 X |
| 3,504,471 | 4/1970 | Aspaas | 52/764 X |
| 4,040,219 | 8/1977 | Budich | 52/732 X |
| 4,130,976 | 12/1978 | Kesseler et al. | 49/505 X |
| 4,525,966 | 7/1985 | Litchfield et al. | 52/397 |
| 4,640,078 | 2/1987 | Haffer | 52/731 |

FOREIGN PATENT DOCUMENTS 1602375 12/1970 France .

Primary Examiner—David A. Scherbel
Assistant Examiner—Creighton Smith

[57] ABSTRACT

A one-piece window frame profile having on its circumference a plurality of grooves, recesses or the like for receiving additional profile strips, seal strips and the like, and trims. The profile consists of Duroplast material reinforced by fiber strands and has a roughly L-shaped cross section, a closed hollow being provided in the long arm of the L-shape and closed hollow in the cross arm of the L-shape. The grooves provided on the circumference have undercuts. In a process for producing the profile, a plurality of fiber strands are continuously impregnated with a Duroplast hardening resin, preferably polyester, said strand are combined into one bundle which is axially inserted in an elongated run-through mold, whose inside is shaped accordingly to the shape of the profile shape to be produced. The fiber strands are so conducted that they surround shafts inserted into the mold to form the hollows of the profile. Resin is hardened in the run-through mold. Windows and doors are produced by using the profile.

12 Claims, 6 Drawing Sheets

WINDOW FRAME SECTION AND PROCESS FOR ITS MANUFACTURE

The invention relates to a window frame section which is of one piece and on its circumference comprises a plurality of grooves, recesses or the like, in which additional profiled strips, sealing strips and the like, as well as trims can be inserted. The profiled section consists of Duropolast material reinforced by fiber strands, particularly glass fiber "rovings", and at least one closed longitudinal hollow.

The object of the present invention is to provide a window frame section of the above-described kind, which with small cross sectional dimensions, particularly a small width of the profile, imparts considerable rigidity and high strength; and which in a simple way can be assembled as a window frame, both as a wing frame and as an outer frame, and affords a simple and practical mounting of trims, sealing strips, and the like.

The window frame section of the invention of the described kind is characterized in that the profile has a roughly L-shaped cross section and a closed hollow in the long arm of the L-shape and a closed hollow in the cross arm of the L-shape, and undercuts in the grooves on the periphery of the profile. The object of the invention is satisfactorily attained by this construction, which exhibits a high degree of strength at a small cross section of the material. This reduces the width of the profile and thereby improves the passage of light at the given overall dimensions of the window. The hollows in the long arm and in the cross arm of the profile favor the best possible rigidity and cause as much as possible, a slight passage of heat; they are also expedient in fastening trims with screws extending into the profile material, since such screws extend into the hollows. The undercuts of the grooves on the periphery of the profile facilitate insertion of trims and sealings and in a simple way secure a satisfactory seat therefor.

An advantageous embodiment of the window frame section of the invention is characterized in that the hollow provided in the long arm of the L-shape extends substantially over the entire length of said arm.

It is advantageous for the mounting of the trims to provide in the profile on the inner side of the long arm of the profile two grooves, each extending roughly over one half of the length of the long arm, said grooves being separated from each other by a middle rib. It is also expedient in such profile, in consideration of tolerance limits, to design the middle rib as a hollow rib, such hollow space being a bulge extending over the length of the hollow of the long arm.

A particularly advantageous embodiment for mounting trims and sealings is characterized in that the profile has on the inner side of the long arm, adjoining the transition corner to the cross arm, a groove having undercut side walls, where in the groove side wall positioned toward the middle of the profile/ from the said groove extends an undercut side groove. The groove provided in this embodiment can also be used for deflecting water from the split space between the wing frame and the outer frame of a window.

A very advantageous embodiment of the window frame section of the invention is characterized in that in the Duroplast material of the profile are embedded fibers extending in the longitudinal direction, as well as a cross reinforcement having fiber strands circumferentially extending round a part of the longitudinally extending fiber strands or round all longitudinally extending fiber strands. The cross reinforcement, due to the thereby-achieved increase in strength in the cross section, facilitates the mounting of the trims and the assembly of profile sections into a frame. It is particularly unexpected in this connection that in asymmetrical profiles significantly cleft by a plurality of grooves, as is the case in window frame sections, a cross reinforcement by fiber strands extending in the circumferential direction of the profile round a part or round all longitudinally extending strands can be embedded.

The term circumferential direction means in this context that the fiber strands extending in this direction are laid round a bundle of fiber strands extending in the longitudinal or axial direction of the profile to be produced; in this connection, under the term circumferential direction falls particularly a course of fiber strands wound around the bundle, substantially positioned to the axially extending fibers located at the edge of the respective bundle, thus, e.g., a spiral course resulting in a continuous winding of a fiber strand bundle supplied at a constant rate to the run-through mold.

A preferred embodiment of the invention of a window frame section provided with a cross reinforcement is characterized in that the fiber strands extending in the circumferential direction are wound as a spiral. A further advantageous development of this embodiment is characterized in that the fiber strands extending in the circumferential direction extend at least around one closed hollow.

As already mentioned, the development of a window frame section of the invention exhibits a high degree of stability, and this can be used by providing on the outer visible areas of the profile a wooden veneer bonded by an adhesive or by being embedded with the Duroplast material of the profile, whereby the mechanical resistance of the reinforced Duroplast plastic provides a stable support for said veneer layer, thereby securing the long life of the veneer surface.

The invention relates to a process for preparing a window frame section as above described, wherein, for producing the profiled window frame section, a plurality of fiber strands are continuously impregnated with a Duroplast hardening resin, preferably polyester, and the fiber strands are jointly conducted for axial entry into an elongated run-through mold to be combined to a bundle filling this run-through mold; the resin is hardened in the run-through mold, and the profiled strand hardened in the run through mold is continuously withdrawn from the outlet opening in the run-through mold.

The object of the invention is to provide a process for rapidly and economically producing the profile of the invention.

The above-described process of the invention is characterized in that the fiber strands are guided around at least two adjacent shafts, said shafts being inserted in the run-through mold to form the hollows of the profiled window frame section, and in that the undercuts on the circumference of the profile are formed by corresponding undercut areas of the run-through mold. This objective is achieved by the features of the invention as above described.

An embodiment of the invention is particularly adapted for preparing profiles having a cross reinforcement by fiber strands extending in the circumferential direction, said embodiment being characterized in that the entire bundle of axially extending fiber strands conducted in the run-through mold and/or of one or both partial bundles, which are axially conducted around the shafts, on the path from the impregnation to the run-through mold., are continuously surrounded by one or a plurality of fiber strands, which extend in the circumferential direction around the said bundle of axially directed fiber strands or around the partial bundle or bundles.

If a higher stability of the profile to be produced is expected only in some areas thereof, the fiber strands extending in the circumferential direction can, if need be, be also provided only in the corresponding partial area or in the corresponding partial areas, by disposing the fiber bundles extending in the circumferential direction only around the partial bundles of the longitudinally extending fiber strands, which are present in the corresponding partial areas.

In order to obtain particularly satisfactory stability and strength in the cross direction in the area of one or both arms of the profile to be produced and at the same time also a satisfactory cross stability of the profile to be produced over its entire cross section, an embodiment of the process of the invention is advantageous, characterized in that one or both partial bundles are continuously surrounded by one or a plurality of fiber strands extending in the circumferential direction and in that said partial bundle or bundles, together with a plurality of fiber strands extending substantially like the axial fiber strands of the said partial bundles, are again continuously surrounded by one or a plurality of fiber strands extending in the circumferential direction.

If a particularly uniform structure is expected in the outer layer of the profile, then an embodiment is advantageous, characterized by following the outer layer of the fiber strands extending in the circumferential direction with a layer outwardly covering the said layer and consisting of axially extending fiber strands in the bundle of fiber strands introduced into the run-through mold. This embodiment is also advantageous for achieving a particularly satisfactory resistance to traction and bending in the longitudinal direction of the profile.

From the apparatus point of view, the fiber strands extending in the circumferential direction of the profile can be simply introduced to improve the transverse stability and transverse strength of the profile by continuously winding one or a plutality of fiber strands around each bundle and/or partial bundle or partial bundles of the fiber strands axially entering the run-through mold, in order to form fiber strands extending in the circumferential direction. In this connection, in order to prevent any twist effects and thus to improve the uniformity of the profile to be formed, at least two winding steps should continuously take place in opposite winding directions relative to each other.

On winding around bundles or partial bundles of axial fiber strands, such bundle is wound around by fiber strands at a place where the corresponding bundle or partial bundles of the axially extending fiber strands is of equal or greater circumference than the by this bundle or partial bundle formed cross section area in the run-through mold of the profile to be produced, so that the fiber strands extending in the circumferential direction in forming the profile can follow the clefts formed by the grooves or the like. Such place can be simply determined, since the axially extending fiber strands coming from the supply spools or the like, depending on the space and construction, must be conducted together to the run-through mold. If it is intended that the fiber strands extending in the circumferential direction form the outermost layer of the fiber reinforcement of the profile to be produced, such that these fiber strands extending in the circumferential direction are wound around the entire bundle of axially extending fiber strands, such bundle is accordingly wound around by the fiber strands extending in the circumferential direction at a place where the bundle circumference is at least equal to the circumference measured on the surface of the profile to be produced.

Such uniform structure of the produced profile, virtually free of twist effects, with a high degree of cross strength and cross rigidity uniformly distributed over the entire circumference and the entire longitudinal stretch of the bundle or partial bundle in wound-around condition, is achieved by a round braid in a spiral surrounding the bundle or partial bundle, consisting of fiber strands extending in the circumferential direction.

An advantageous embodiment, particularly adapted for achieving a very good adjustment of the cross reinforcement extending in the circumferential direction to the shape of the profile, even in a condition much cleft by grooves, recesses or the like, is characterized in that, in order to form the fiber strands extending in the circumferential direction, a round cord consisting of one or a plurality of fiber strands, surrounds, like a hose, a bundle or partial bundle. In this connection, if so intended, also a plurality of such round cords can be provided, e.g., to form in a plurality of adjacent partial bundles fiber strands extending in the circumferential direction, which in each case surround one of these partial bundles, or to surround one or a plurality of partial bundles, and additionally also the total bundle by fiber strands extending in the circumferential direction. Such round cord can be made of one fiber strand, but for a higher rate of work, it is advantageous in making such cord to knit simultaneously a greater number of fiber strands (threads) on a corresponding number of circumferential places of the resulting round cord.

It is advantageous to use rovings, preferably of glass fibers, as axially extending fibers. This offers advantages both in respect of a good intake of the plastic used for impregnation and of adjustment of the bundle formed by the fiber strands to the form of the profile to be produced and secures in each case the intended distribution of the axially extending fiber strands over the profile cross section and a uniform and simple filling of the profile cross section. Also rovings, preferably of glass fibers, can be used for the fiber strands extending in the circumferential direction. The feature of satisfactory resin absorption by rovings makes it quite possible to dispense with the impregnation of the fiber strands extending in the circumferential direction; particularly, when preimpregnated axially extending fiber strands are laid over the circumferentially extending fiber strands there can be expected a satisfactory impregnation of the introduced not-impregnated rovings forming circumferentially extending fiber strands by the resin present on the axially extending fiber strands Basically, also other structures than rovings are suitable for the process of the invention for forming fiber strands, namely strands where short fibers are joined, as practiced in the textile industry. Next to glass, other materials used in the textile industry are considered as material for the fibers, such as man-made textile fibers, with preference given to polyester fibers; also other man-made fibers, e.g., aramid fibers and carbonaceous fibers when exceptional strength is expected.

It is also advantageous if, in addition to the resin introduced by the impregnation of the fiber strands, other duroplastically hardening material is injected. Such additional injection of plastic material into the run-through mold can impart various advantageous characteristics to the finished profile and can also provide advantages to the process. The injection of additional resin material into the run-through mold results in a higher content of resin in the surface area of the profile to be produced than in the core areas of the profile, thus increasing the resistance of the ready profile against climate and wear. Such improvement of the features of the produced profiles is enhanced by a suitable selection of the composition of the additionally injected plastic materials; for example, a special composition of said plastic material, e.g., a higher content of acrylic resin, achieves a particularly satisfactory resistance to UV.

The invention will now be described with reference to the diagrammatic drawings showing examples of profiles of the invention and of windows constructed by such profiles as well as devices for carrying out the process.

In the drawings:

FIGS. 1 to 4 show embodiments of the cross sections of the profile of the invention, FIG. 5 diagrammatically shows an example of a device applied for carrying out the process of the invention together with the process course applied to an embodiment of the process of the invention, FIG. 6 is a detail of a variation of a device applied for carrying out the process of the invention, and FIG. 7 is a detail of another variation of such device;

Figure 1:
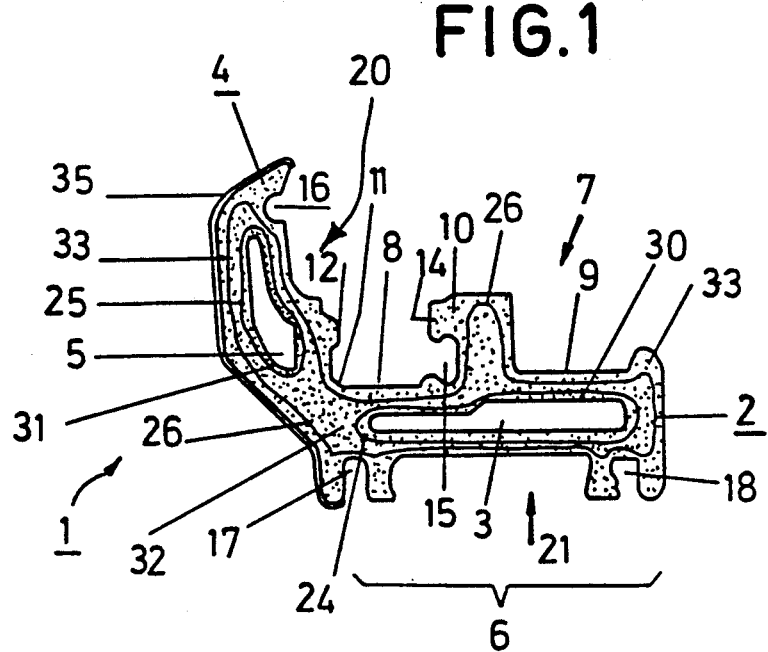

FIG. 1 shows a roughly L-shaped window frame in cross section. The profile 1 has in the long arm 2 a closed hollow 3 and in the transverse arm 4 a closed hollow 5. The hollow 3 in the long arm 2 extends substantially over the entire length of said arm 2. On the inner side 7 of the long arm 2 section 1 has two grooves 8, 9, each extending roughly over the half of length 6 of the long arm, said grooves being separated by a middle rib 10. The groove 8 adjoins at the transition corner 11 the transverse arm 4, the side walls 12, 14 of the grooves 8 being undercut. An undercut side wall 15 extending from said groove 8 is provided in the groove side wall 14 lying toward the middle of the profile. Still other grooves 16, 17, 18, also with undercuts, are provided on the circumferential area of the section. The groove 16 is provided on the inner side 20 of the transverse arm 4 and grooves 17, 18 on the outer side 21 of the long arm 2. The said grooves receive or fasten additional profiled strips, seal strips, and the like, as well as trims in the production of frames for windows and doors of such profile Profile 1 of Duroplast material is reinforced with fiber strands, particularly glass fiber rovings. Both fiber strands extending in the longitudinal direction of the profile, i.e., perpendicularly to the plane of drawing, and fiber strands extending in the circumferential direction are used for reinforcement. There are provided fiber strands 24 extending in the circumferential direction, which extend around the hollow 3; fiber strands 25 extend in the circumferential direction around the hollow 5, and fiber strands 26 extend in the circumferential direction around both hollows 3, 5, roughly following the circumferential area 27 of profile 1. Fiber strands 24 extending in the circumferential direction surround a partial bundle 30 of the longitudinal fiber strands, which, in turn, surrounds the hollow 3, and the fiber strands 25 extending in the circumferential direction surround a partial bundle 31 of longitudinal fiber strands, which, in turn, surrounds the hollow 5. Fiber strands 26 extending in the circumferential direction surround the partial bundles 30 and 31 of the longitudinally extending fiber strands, and other longitudinal fiber strands form a partial bundle 32 lying outside the fiber strands 24 and 25 extending in the circumferential direction. The outer fiber strands 26 extending in the circumferential direction are followed by axially extending fiber strands, which form a layer 33, which outwardly covers the fiber strands 26 extending in the circumferential direction. If so intended, the layer 33 can be followed by a layer of plastic material which is injected into the shape-forming mold in the production of such profile.

Profile 1 carries on the outer sight areas of the transverse arm 4 a wooden veneer 35, bonded by an adhesive or embedded in the Duroplast material of the profile.

Figure 2:
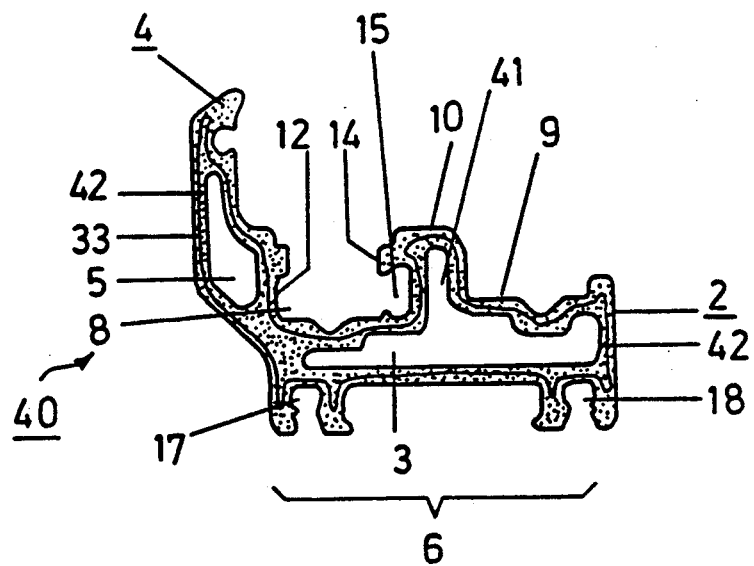

The outer shape of profile 40 shown in FIG. 2 is a variation similar to the profile shown in FIG. 1. Profile 40 is also of a roughly L-shaped cross section and has a closed hollow 3 in the long arm 2 and a closed hollow 5 in the transverse arm 4 of the profile. The hollow 3 provided in the long arm 2 extends substantially over the entire longitudinal stretch 6 of the arm 2; a middle rib 10 in the shape of a hollow rib lies between the grooves 8 and 9, and its hollow 41 is a concave bulge in the hollow 3. In the Duroplast material, of which the profile 40 is made, are embedded longitudinal fiber strands indicated by dots, and fiber strands 42 extending in the circumferential direction; they surround a portion of the longitudinal fiber strands and are conducted around hollows 3 and 5. A layer 33 of longitudinal fiber strands extending in the circumferential direction outwardly covers the circumferentially extending fiber strands 42.

Figure 3:
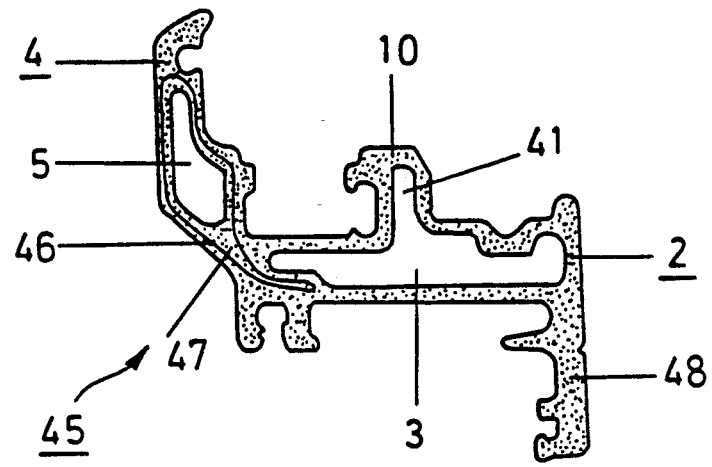

FIG. 3 shows a profile 45, which is another variation of the profile of FIG. 1. Profile 45 has a cross reinforcement only in the area of hollow 5 of the transverse arm 4 in the form of fiber strands 46, which extend around the hollow 5 and a partial bundle 41 of longitudinal fiber strands, which, in turn, surrounds the hollow 5. The middle rib 10 of the profile 5, analogously as the middle rib of profile 40 of FIG. 2, is a hollow rib, whose hollow 41 is a salient bulge of the hollow 3 of the long arm 2. On the free end of the long arm 2 of the profile 45 is formed an outer strip 48 adapted for mounting sheets of glass, fillings or the like in frames assembled from a profile 45.

Figure 4:
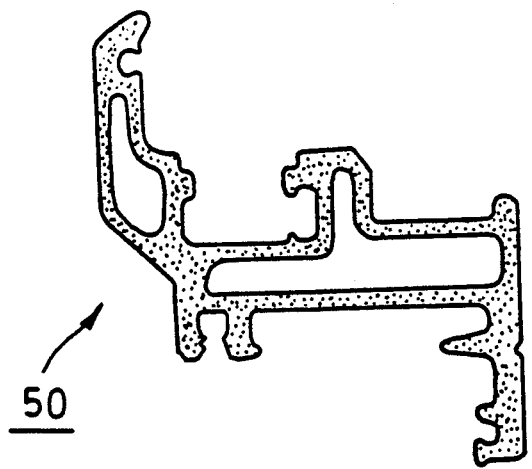

FIG. 4 shows a profile 50 similar to the profile 45 without any fiber strands extending in the circumferential direction in the Duroplast material of which the profile is made.

Figure 5:
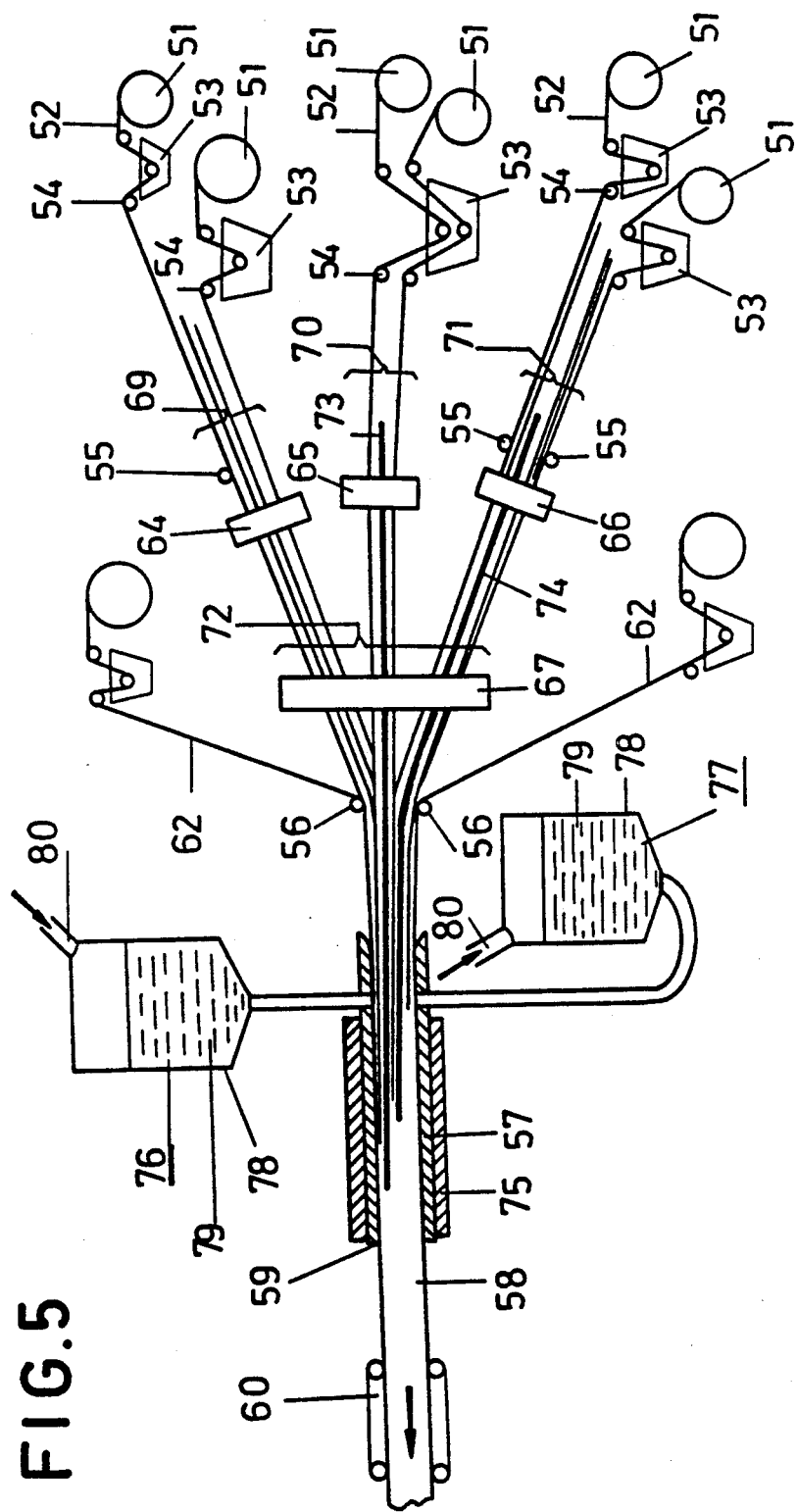

The device shown in FIG. 5 for carrying out the process of the invention comprises a plurality of supply spools 51 disposed in suitable bearings; these supply spools have a supply of fiber strands 52, preferably provided by so-called rovings. The fiber strands 52 pass through impregnation devices 53 where they are impregnated with a Duroplast setting resin. After fiber strands 52 have left the impregnation devices 53, they are conducted by guide means 54 provided at the outlet of the impregnation devices 53 and in some cases are jointly conducted by still other guide means 55, 56 to be joined into a bundle, which axially enters into a longitudinal run-through mold 57 where the plastic resin with which the fiber strands 52 have been impregnated is set, so that a bundle of resin-impregnated fiber strands 52 are transformed in said hollow to a hardened profile strand 58, which then is continuously withdrawn from the outlet opening 59 of the run-through mold 57; such withdrawal is by means, for example, of a roller and worm offtake means 60. The profile strand leaving the run-through mold 57 is then divided in the offtake means 60 into pieces of suitable length. The device shown in FIG. 5 also comprises annular winding means 65, 65, 66, 67, by means of which partial bundles 69, 70, 71, 72, each consisting of a considerable number of already impregnated fiber strands 52, if so intended, can be wound around by fiber strands which extend around the respective partial bundles, i.e., in the circumferential direction. In the illustrated case, the partial bundles 69, 70 and 71 form together the partial bundle 72 and, accordingly, with the annular winding means 67, another layer of fiber strands extending in the circumferential direction can be applied around the partial bundles 69, 70, 71 already wound around by the fiber strands extending in the circumferential direction. On this layer can be applied another layer of axially extending preimpregnated fiber strands 62, which form the surface layer of the profile to be produced, and the bundle so produced of fiber strands is axially introduced into the run-through mold 57.

The inside of the run-through mold 57 is configured accordingly to the shape to be produced of the profile or profile strand 58.

Suitable shafts, 73, 75 are introduced into run-through mold 57 to form the axially extending hollows in the profile strand 58.

Two injection devices 76, 77 are connected to the run through mold 57, which is provided with a heating jacket 75. Plastic material can be injected by these devices into the inside of the run through mold 57. These devices have a supply container 78 for the plastic material 79, and said plastic material has a pressurized medium, particularly pressurized air, supplied through a connection 80, for pressing into the run-through mold 57. It is also possible to work with a single injection device.

Figure 6:
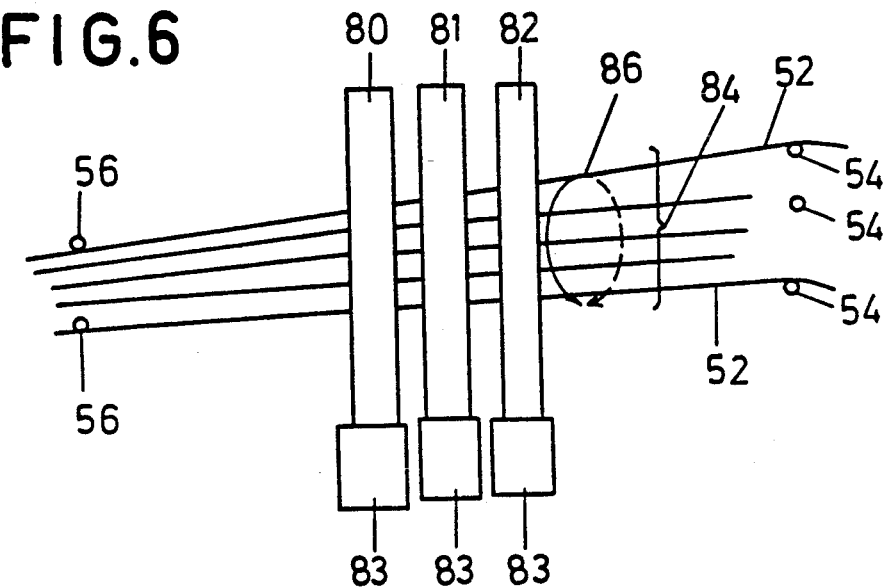

Instead of simple annular winding devices such as in the apparatus shown in FIG. 5, also annular winding devices can be provided for winding fiber strands extending in the circumferential direction into bundles or partial bundles consisting of axially extending fiber strands, such latter annular winding devices simultaneously laying a plurality of fiber strands in the circumferential direction around the bundle FIG. 6 diagrammatically shows such device, namely, a plurality of annular winding aggregates 80, 81, 82, each provided with a drive means 83. These annular winding aggregates 80, 81, 82, through which is conducted the bundle to be wound around consisting of axially extending fiber strands, can be driven in the same rotational direction or in different rotational direction, in the latter case the windings being formed in a mutually opposite winding direction.

A suitable position of the guide means 54 and 56 conducting the axially extending fiber strands 52 and suitable positioning of the annular winding direction relative to said guide means can be achieved in that the circumference 86 of the bundle 84 present at the place of the annular winding devices corresponds to the circumferential length of the layer surrounding the bundle 84 in the produced profile.

Figure 7:
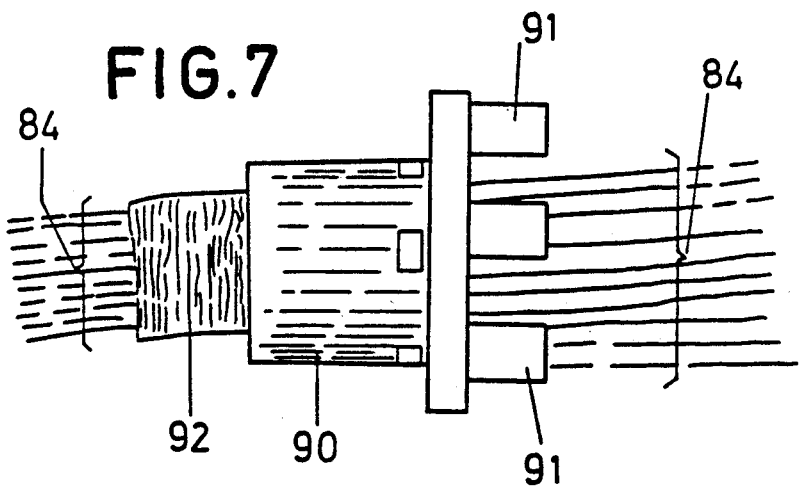

In order to achieve a satisfactory adjustment to the shape of the profile of the layers of fiber strands extending in the circumferential direction in producing the profiles, it is expedient for forming the fiber strands extending in the circumferential direction to produce a tube-like annular braid, which surrounds the respective bundle or partial bundle of fiber strands extending in the axial direction. In this connection, FIG. 7 shows how to dispose an annular braid aggregate 90 in a device for carrying out the process of the invention, said aggregate being fed by one or a plurality of ring-shaped thread supply spools 91 and guided through the bundle 84 formed by axially extending fiber strands, said bundle to be surrounded by fiber strands extending in the circumferential direction. A tube-like round braid 92 is continuously produced in the aggregate 90 to surround the bundle 84.

Figure 8:
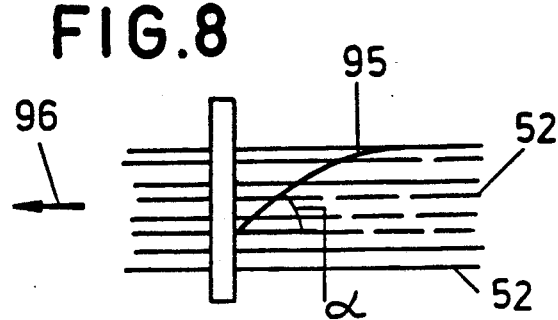
FIG. 8 shows the geometry in laying a fiber strand around a bundle of axially extending fiber strands.

If the fiber strands extending in the circumferential direction are wound around a bundle of axially extending fiber strands 52 by a stationarily-disposed winding device, the result is a spiral-shaped curse of the fiber strands 95, which surround the bundle formed of axially extending fiber strands 52, as diagrammatically shown in FIG. 8. According to the rate of travel of the axially extending fiber strands 52 in the direction of the arrow 96 to the run-through mold according to the rotational rate with which are laid the strands 95 extending in the circumferential direction around the bundle consisting of axially extending fiber strands 52, there is produced an angle $\alpha$ between the axially extending fiber strands 52 forming the outer layer of the bundle and the circumferentially extending fiber strands 95. It is expedient in this connection so to determine the rate of the fiber strands 52 and the rotational rate of the annular winding device respect of each other that said angle lies in the range between 10° and 60°, an angle of about 45° being advantageous in practice.

In another variation for forming a layer of fiber strands surrounding a bundle of axially extending strands, said fiber strands being wound in the circumferential direction around said bundle, said bundle can also be surrounded by an annular cord which is formed by a cord aggregate of a multiplicity of fiber strands. Also a variation can be considered for forming fiber strands extending in the circumferential direction by laying around the bundle a strip axially supplied to the run-through mol where is present a multiplicity of fiber strands or fiber strand segments, which, after the strip is wound round the bundle, extend in the circumferential direction.

Figure 9:
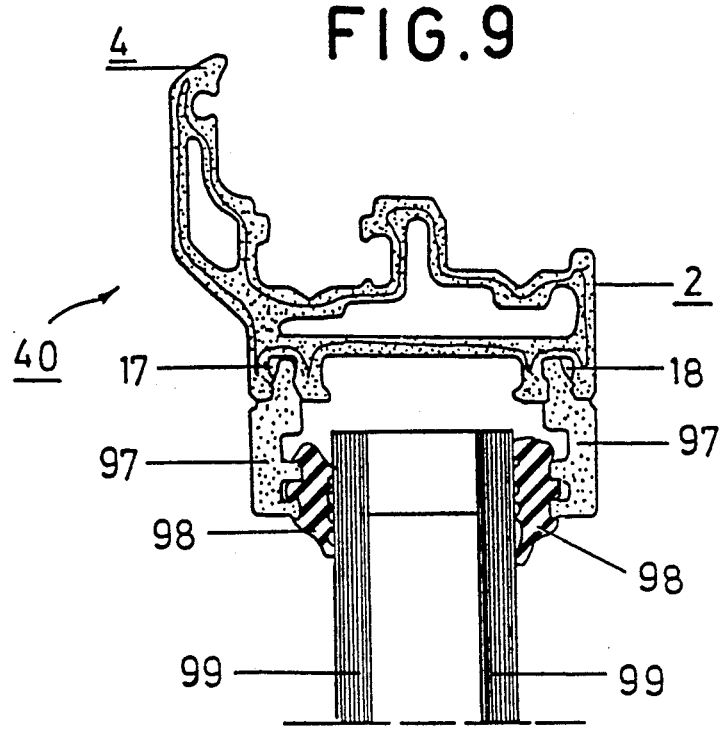
FIGS. 9 to 11 show in cross section parts of embodiments of windows according to the invention.

FIG. 9 shows in cross section a portion of a window produced from a window frame section shaped according to FIG. 2 In this connection, the cross arm 4 of the window frame section 40 provides the mating edge of the window frame to a (not shown) outer frame, securing the connection of the window frame with the glass pane from the long arm 2 of the window frame section 40. Grooves 17, 18 on the long arm 2 are provided for such purpose of receiving additional profile strips 97 to hold glass panes 99 with the aid of intermediate seal strips 98.

Figure 10:
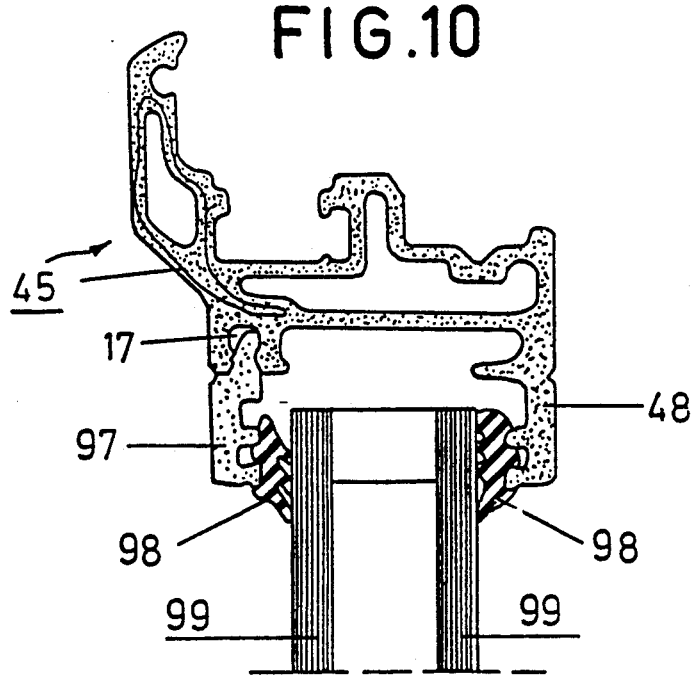

FIG. 10 shows a window, whose frame has been produced by using a frame profile according to FIG. 3, said window being a variation of that of FIG. 9. It differs from FIG. 9 in that the window frame section 45 carries on one side an outer strip 38, which, through the intermediary of a seal strip 98, supports glass panes 99 toward one side and holds the same. Toward the other side, in the same way as in the window shown in FIG. 9, the pane is supported or held firm by an additional profiled strip 97, inserted into the groove 17 of the frame profile 45 with a seal strip 98 inserted therebetween.

Figure 11:
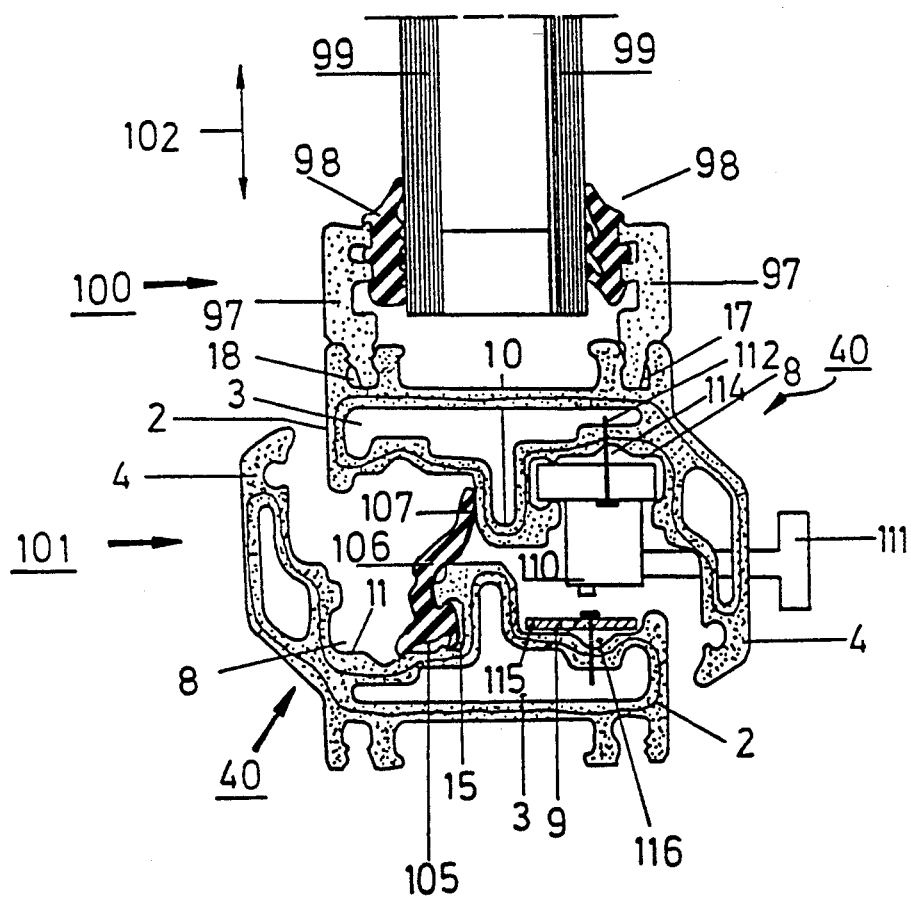

The frame range of an embodiment of a window is shown in FIG. 11 in cross section. It shows a wing frame 100 and an outer frame 101 assembled of segments of a frame profile of FIG. 2. Both in the wing frame 100 and the outer frame 101, the cross arm 4 of the profile 40 extends parallel to the window plane as indicated by the double arrow 102, and the long arm 2 of these profiles extends perpendicularly to the said plane; it is assumed in this connection that the wing frame 100 is in the position shown in FIG. 11. The profiles of the wing frame 100 stand opposite the profiles of the outer frame 101 in a position turned 180°. Glass panes 99, the same as in the embodiment of FIG. 9, are held in the profile of the wing frame with additional profile strips 97 inserted in the grooves 17, 18 of the profile of the wing frame, with seal strips 98 therebetween. A seal strip 106 provided with holding slots 105 is inserted in the undercut side groove 15 of the profile forming outer frame 101, said seal strip 106 having a seal lip extending from the groove 8 of the profile of the outer frame, said lip abutting the middle rib 10 of the profile of the wing frame when the window is closed. Trims 110 with handles 111 are mounted in the groove 8 of the profile of the wing frame, which adjoins the transition corner 11 of the said profile. The mounting is by screws 112 which are screwed into the bottom of the groove 8, which has a slot 114, said screws extending into the hollow 3. Correspondingly, countertrims 115 are provided in the groove 9 of the upper frame 101; they are also mounted by screws, which are screwed into the bottom of the groove 9 provided in a slot 116.

In a way similar to that explained above with reference to FIGS. 9 to 11, the frame profiles of the invention can also be used for wing frames and outer frames of doors. Since there is no need for passage of light in door frames, the inner space of the wing frame of such doors can be filled with opaque panels or the like, such panels, in a way similar to the glass panes of the above-described windows, can be held firm in the grooves provided in the profile in the wing frame.

We claim:

1. A one-piece window frame profile having on its circumference a plurality of grooves, recesses and the like for receiving additional profiled strips, seal strips and the like, said profile comprising:
    a generally L-shaped cross section having a long arm and a transverse arm;
    said long arm of the L-shaped cross section having a closed hollow space therein; and
    said transverse arm of the L-shaped cross section having another closed hollow space therein;
    wherein said grooves and recesses are provided with undercut areas and said profile is made of duroplastic material and is reinforce by fiber strands, particularly glass fibers, which extend and are spread in the longitudinal direction over the whole cross section area and including the undercut areas of the profile.

2. The window frame profile according to claim 1 wherein the hollow space in the long arm of the L-shape cross section extends substantially over the entire length of the long arm.

3. The window frame profile according to claim 1 or 2, wherein the profile has on the inner side of the long arm two grooves, each extending roughly over the half of the length of the long arm, said two grooves being separated by a middle rib.

4. The window frame profile according to claim 3, wherein the middle rib has a hollow space which is a lateral extension of said closed hollow space extending over the length of the long arm.

5. The window frame profile according to claim 1, wherein the profile on the inner side of the long arm, joining a transition corner to the transverse arm, has a groove provided with two undercut side walls, an undercut side groove extending from said groove into one of the groove side walls located toward the middle of the long arm.

6. The window frame profile according to claim 1, wherein the profile includes a cross reinforcement comprising other fiber strands extending in the circumferential direction around the longitudinally extending fiber strands.

7. The window frame profile according to claim 6, wherein the other fiber strands extending in the circumferential direction are wound like a spiral.

8. The window frame profile according to claim 6, wherein the other fiber strands extending in the circumferential direction extend around at least one of the closed hollow space in the long arm and said another closed hollow space in the transverse arm.

9. The window profile according to claim 1, wherein the profile carries on the outer visible areas of the transverse arm a wooden veneer bonded or embedded with the duroplastic material of the profile.

10. A window arrangement having an outer frame and at least one wing frame by using a frame profile of claim 1, comprising:
    at least one glass pane being assembled with the frame profile by providing additional profiled strips on the outer side of a long arm of the profile and intermediate seal strips between the profiled strips and the glass pane, and a transverse arm of the profile providing a mating edge of the wing frame to the outer frame and securing the wing frame thereby.

11. A window arrangement of claim 10, wherein the additional profiled strips are inserted in two grooves formed on opposite ends of the long arm of the profile.

12. A door arrangement having an outer frame and a wing frame by using a frame profile of claim 1, comprising;
    a door panel being assembled with the frame profile by securing additional profiled strips in at least one groove on the outer side of the long arm of the profile and providing intermediate seal strips between said profiled strips and the door panel, and the outer frame being the same frame profile but in a position turned 180° so that other seal strips connect the framed panel with the outer frame at a rib portion of each profile.

* * * * *